May 11, 1948. W. CHAUSSÉ 2,441,471
TRACTION ATTACHMENT FOR DRIVING WHEELS
Filed March 22, 1945
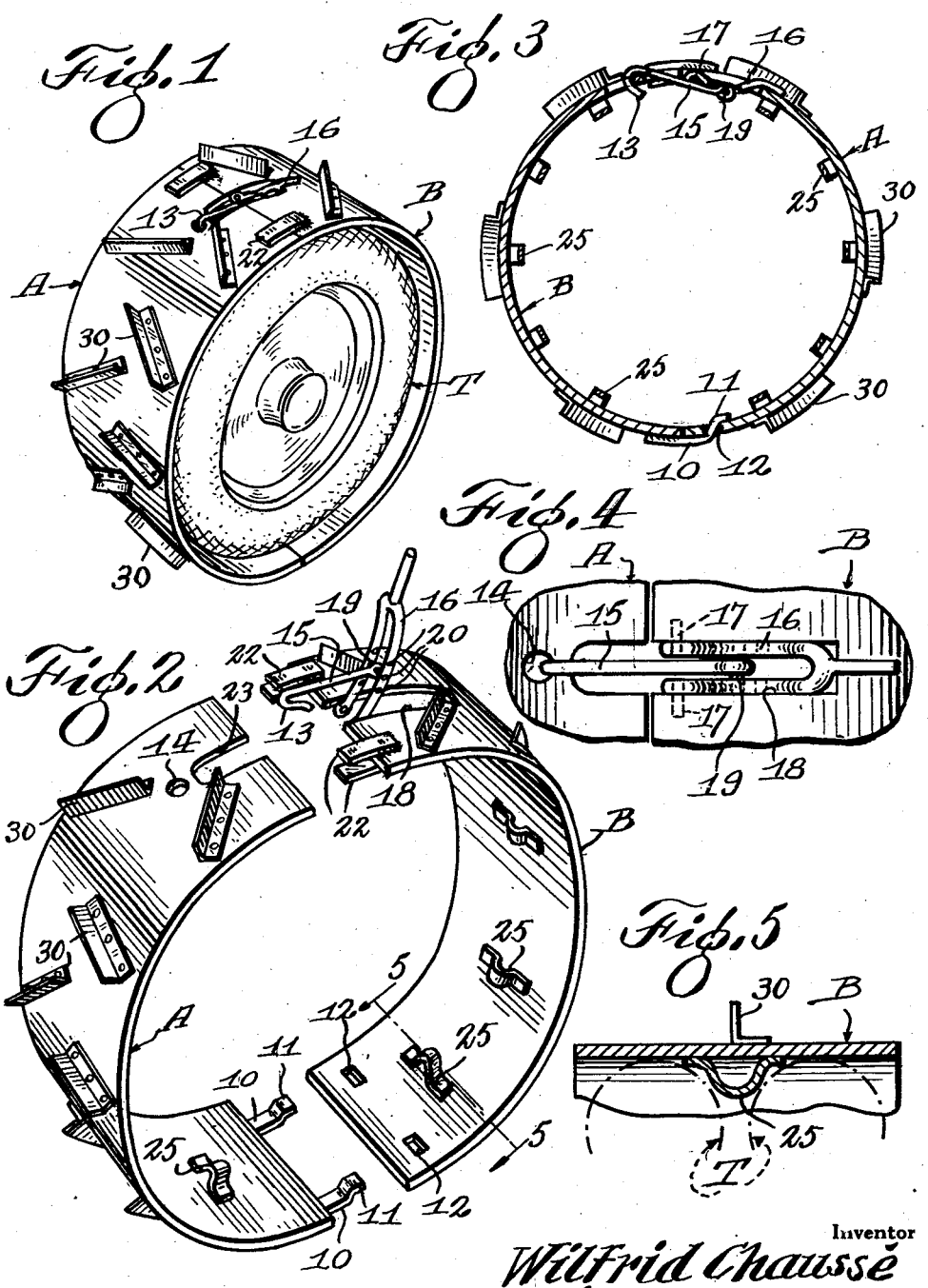
Inventor
Wilfrid Chaussé
By Robic & Bastien
Attorneys Patented May 11, 1948

2,441,471

UNITED STATES PATENT OFFICE 2,441,471

TRACTION ATTACHMENT FOR DRIVING WHEELS

Wilfrid Chaussé, Granby, Quebec, Canada

Application March 22, 1945, Serial No. 584,168
In Canada January 13, 1945

1 Claim. (Cl. 152—56)

The present invention relates to a traction device and, more particularly, an attachment for the driving wheels of motor vehicles.

The main object of the invention resides in the provision of means of the character described, whereby the driving wheels of a motor vehicle can be rendered more efficient to perform correctly in sand, muddy, loose soil or in snow.

An important object is also the provision of attachment means of the character described which are attachable, or removable, in a few moments.

Another object relates to a traction attachment for wheels which is simple, rugged and applicable to existing vehicles.

Another object concerns such an attachment which would be easily manufactured at relatively low cost.

Other objects and advantages of the invention will become apparent, or be pointed out further, during the description to follow.

As an example, and for purposes of illustration only, an embodiment of the invention is shown in the annexed drawing wherein:

Figure 1 is a perspective view of the traction device in the form of an attachment secured to the dual driving wheel of a vehicle, Figure 2 is a perspective view of the attachment proper, Figure 3 is a vertical section taken through the attachment in closed position, Figure 4 is a plan view of the attachment securing means, and Figure 5 is a transverse section taken on line 5—5 of Figure 2.

Referring to the drawings wherein similar reference characters represent corresponding parts throughout, the letter T indicates one of the dual tires of a truck, for example, said tire being provided peripherally with the attachment of the invention which consists essentially of two semicircular complementary members A and B having means for operatively associating with said tires in a removable manner.

As shown to advantage in Figures 2 and 3, the members A and B are adapted to be hingedly connected together, in a removable manner, by means of lugs 10 welded or otherwise secured adjacent the side edges of the member A on one end thereof. Said lugs have an outer offset tongue 11 which is adapted to enter corresponding rectangular apertures 12 formed on one end of member B adjacent the corner thereof. Thus, the tongues 11 are bent to enter the apertures 12 when the meeting ends of members A and B are disposed opposite each other in an angular position, after which the said tongues will assume a position inside the member B, as shown in Figure 3. Therefore, the members just described operate to secure together one end of members A and B.

The other ends of the members are removably joined together by means of a hook 13 operatively connected to member B and engageable in a central aperture 14 formed in the member A. The shank 15 of the hook is pivoted to the intermediate portion of a forked lever 16, said lever being journaled to the end of member B by means of trunnion-like studs 17 welded or otherwise attached to said member and projecting inwardly in opposed position within an elongated slot 18 of member B for the purpose of allowing swinging motion of the forked-lever 16 below the centre line of the trunnions 17.

As shown to advantage in Figure 2, the shank 15 is pivoted to the lever 16 by means of a pintle 19 adapted to be selectively disposed in holes 20 bored in the arm of the lever so as to adjust the position of the hook 13 with respect to the aperture 14.

The member securing means are completed by the addition of guiding means constituted of a pair of spaced parallel straps 22 secured to the member B and adapted to straddle the end of the member A, as shown in Figure 2. In order to enable the lowering of the shank 15, as shown in Figure 1, the member A is provided with a slot 23 corresponding in width to the slot 18 of the member B and forming a continuation thereof when the members are in closed position.

The closing mechanism just described is adapted to function as a toggle, inasmuch as the pivot 19 of the shank 15 swings below the pivot line constituted by the trunnions 17; thus, the pintle 19 occupying a position below said pivot, when the lever is in closed position, tends to keep said lever against accidental opening of the members when in operative position over the tires of a vehicle.

So as to prevent lateral, or sideways, motion of the plate over the tires, locating means are disposed inside the said members, which locating means consist of arched elements 25 welded or otherwise attached on the inside surface of the members A and B, at spaced intervals thereon and along an imaginary centre-line parallel to the sides of said members and midway therebetween. Consequently, as shown in Fig. 5, said arched elements are meant to occupy a position between the dual tires and, thus, be prevented from moving sideways by the same tires.

Finally, the outside surface of the members A and B is provided with ground-engaging cleats 30, suitably attached thereto and disposed angularly with respect to the side of said members and with each other, said cleats being furthermore staggered from side to side, as shown in Figures 1, 2 and 3. Obviously, the purpose of said cleats is to engage the ground over which the vehicle is to be operated and perform accordingly similarly with the cleats or other ground-engaging members normally found on the driving wheels of tractors and the like.

In other words, the purpose of the present attachment is to transform the driving wheels of a vehicle so that said wheels are better adapted to perform in loose, sandy and muddy soil, or even in snow.

The members presently described are easily attachable to the wheels of a vehicle by the simple expedient of disposing one of said members in contact with the tires, advancing the vehicle so that the tires rise partly over said member and, thereafter, connecting the other member by means of the devices previously described. Once provided with the members, the vehicle wheel is furthermore protected against the irregularities and other dangers of the road, such as sharp stones, stumps and the like. Again, the attachment can be removed at a moment's notice and, consequently, the vehicle so equipped is adaptable at will to operate in the fields or on paved roads, with a minimum of trouble.

Naturally, although the present attachment has been illustrated and described as applicable to dual wheels, the members A and B can be similarly applicable to trucks with single driving wheels, by the simple expedient of providing arched members 25 on both sides of said tires instead of the single element disposed centrally.

The present invention is, consequently, an advance of the art in traction attachment, in that it provides simple and efficient means for increasing the traction of a vehicle-driving wheel by means of readily attachable or removable members provided with ground-engaging cleats which, in turn, are also changeable when worn out.

It must be understood that various changes as to the size, shape and arrangement of parts may be resorted to without departing from the spirit of the invention, or the scope of the subjoined claim.

Having thus described my invention, I claim:

A traction attachment for vehicle tire comprising, in combination, a pair of semi-circular plates adapted to encircle the tires of a vehicle, ground-engaging cleats on the outside periphery of said plates, means on the plates for preventing lateral displacement thereof relative to the tires, hinge means for removably securing the plates at one pair of adjacent ends, said hinge means comprising lugs projecting from an end of one plate, the other plate having apertures into which said lugs are adapted to fit, and the other pair of adjacent plate ends having, respectively, a slot and an aperture, means for locking together said plate ends comprising a lever pivotally secured to a plate end at said slot having a curved shank, a hook member engageable in said aperture and pivotally secured to said shank, whereby the lever is operable on said hook to draw the plate ends together and the curved shank is pivotable to within the slot to lock the means.

WILFRID CHAUSSÉ.

REFERENCES CITED

The following references are of record in the file of this patent:

UNITED STATES PATENTS

| Number | Name | Date |
| --- | --- | --- |
| 997,646 | Bruce | July 11, 1911 |
| 1,153,194 | Christenson | Sept. 14, 1915 |
| 1,402,142 | Brintnall | Jan. 3, 1922 |